United States Patent [19]

Sallach et al.

[11] 4,305,326

[45] Dec. 15, 1981

[54] COMPACT CLUTCH MECHANISM

[75] Inventors: John H. Sallach, Los Angeles; Dale E. Schmaenan, Ventura, both of Calif.

[73] Assignee: Hughes Helicopter, Inc., Culver City, Calif.

[21] Appl. No.: 46,665

[22] Filed: Jun. 8, 1979

[51] Int. Cl.³ .................... F41D 11/00; F16D 7/02; F16D 43/20

[52] U.S. Cl. ................................. 89/33 CA; 89/11; 64/29; 192/56 R

[58] Field of Search .............. 192/56 R, 56 C, 71; 64/30 E, 29; 89/33 CA, 11

[56] References Cited

U.S. PATENT DOCUMENTS

| | | | |
|---|---|---|---|
| 1,325,464 | 12/1919 | Decker | 64/29 |
| 1,805,692 | 5/1930 | Ferenci | 64/29 |
| 2,849,921 | 9/1958 | Otto | 89/12 |
| 2,860,498 | 11/1958 | Crossley | 64/29 |
| 2,882,704 | 4/1959 | Quackenbush | 64/29 |
| 3,410,381 | 11/1968 | Henshaw et al. | 89/33 BA X |
| 3,877,253 | 4/1975 | Yeagle | 192/56 R X |

OTHER PUBLICATIONS

"Introducing the Chain Gun", Geddes, *International Defense Review*, vol. 10, No. 2, Apr. 1977, pp. 271-274.

"The Chain Gun for the AAH-Design-to-Cost in Action", Brix, *National Defense*, vol. LVIII, No. 322, pp. 351-354.

*Primary Examiner*—Rodney H. Bonck

*Attorney, Agent, or Firm*—Smyth, Pavitt, Siegemund & Martella

[57] ABSTRACT

A clutch assembly includes axially aligned shafts, one driving and one driven, the driving shaft including a plurality of slots and the other a plurality of apertures aligned with the slots. Elongated roller bearings are positioned in the slots and apertures to lock the shafts together, a resilient member being used to urge the bearings radially inwardly. In the event that one of the shafts slows substantially relative to the other, the bearings move radially outwardly to declutch the shafts.

13 Claims, 11 Drawing Figures

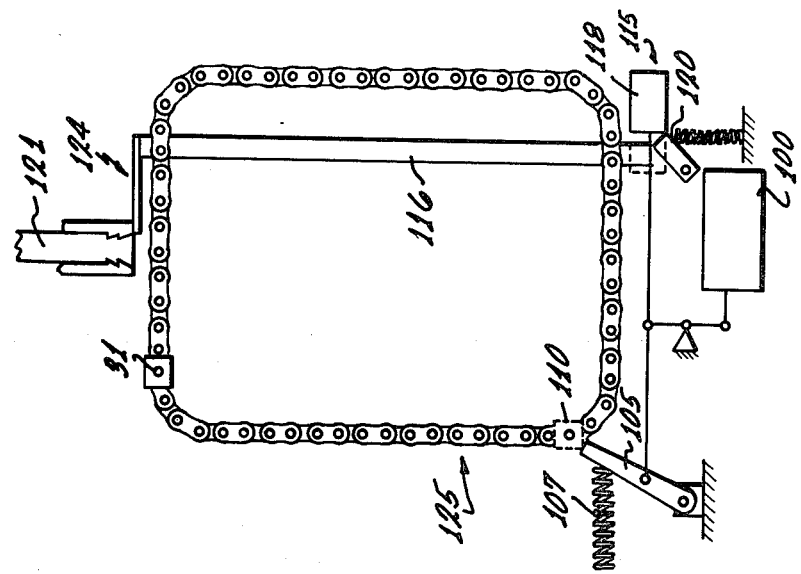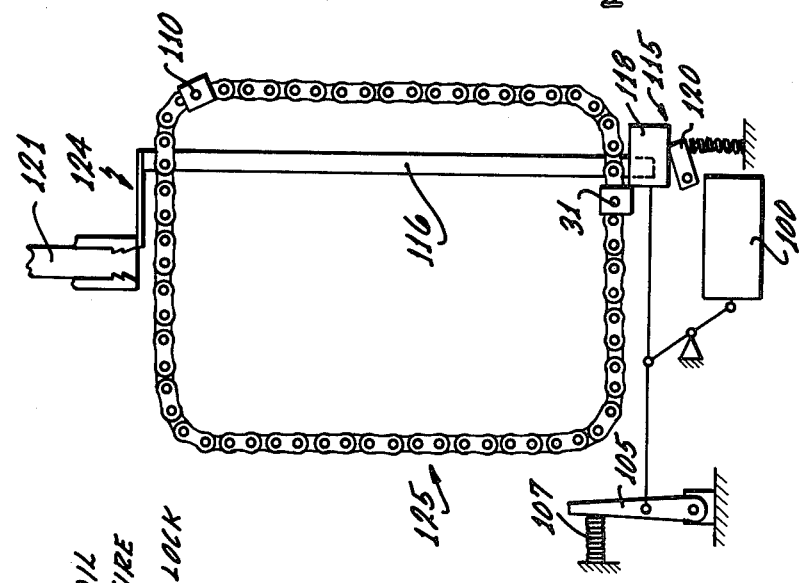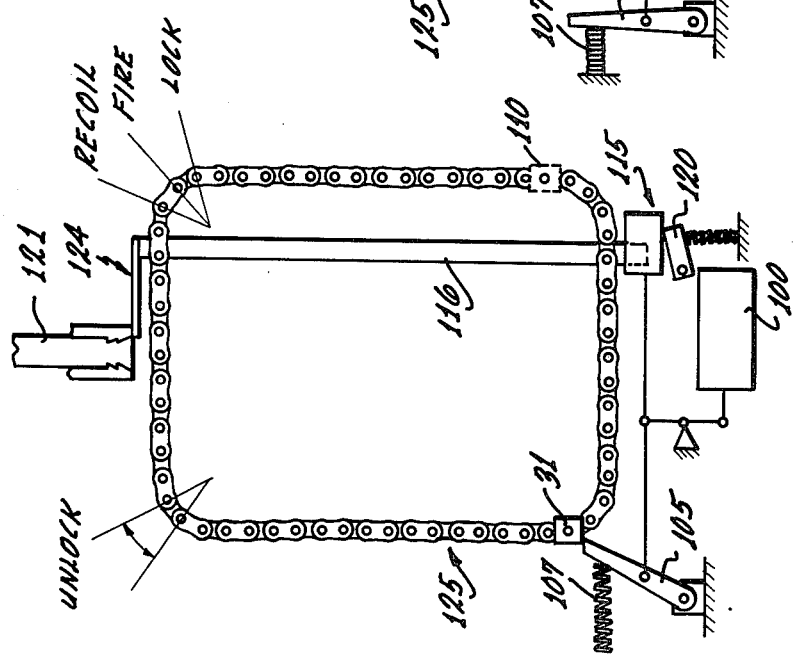

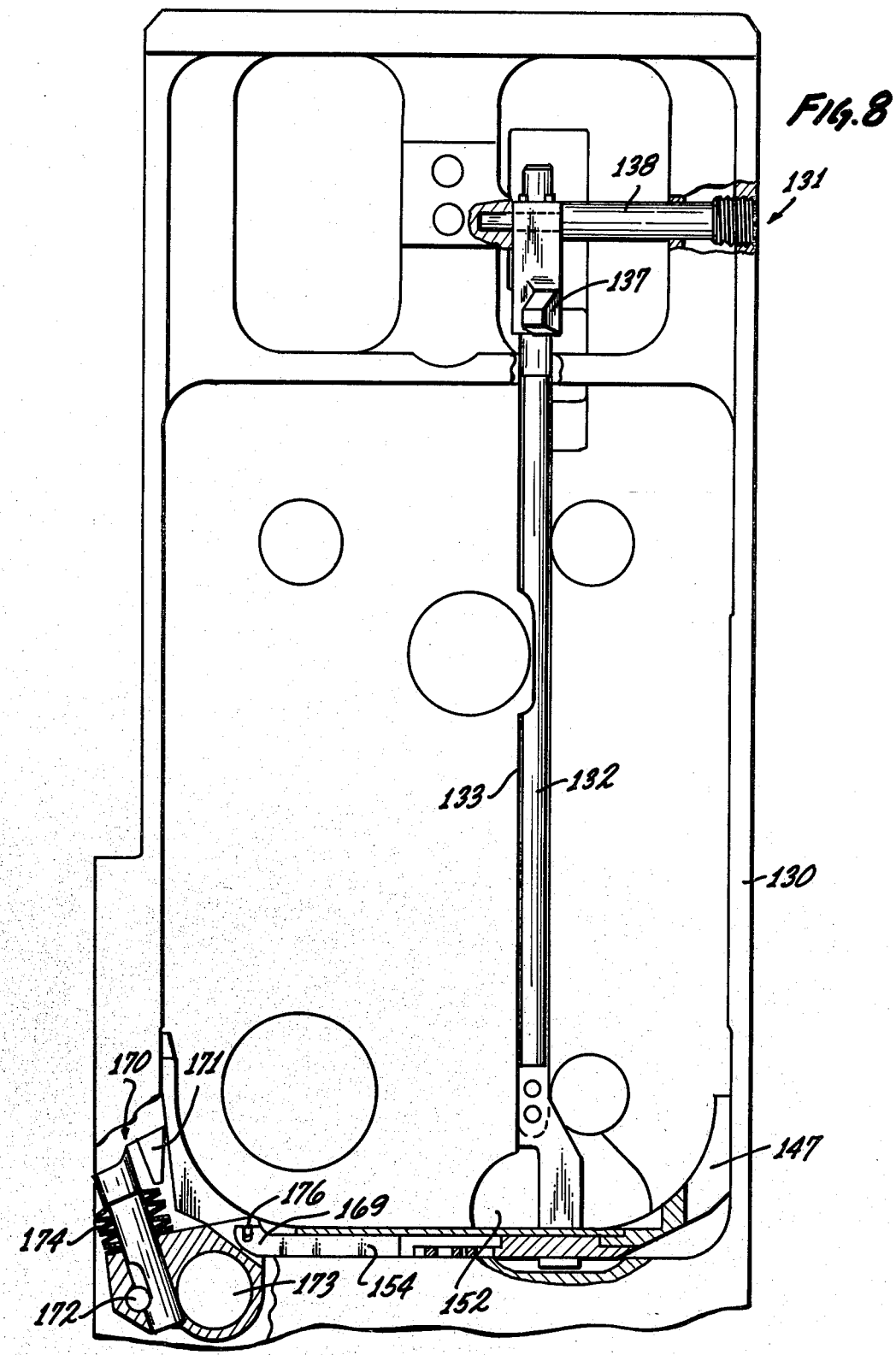

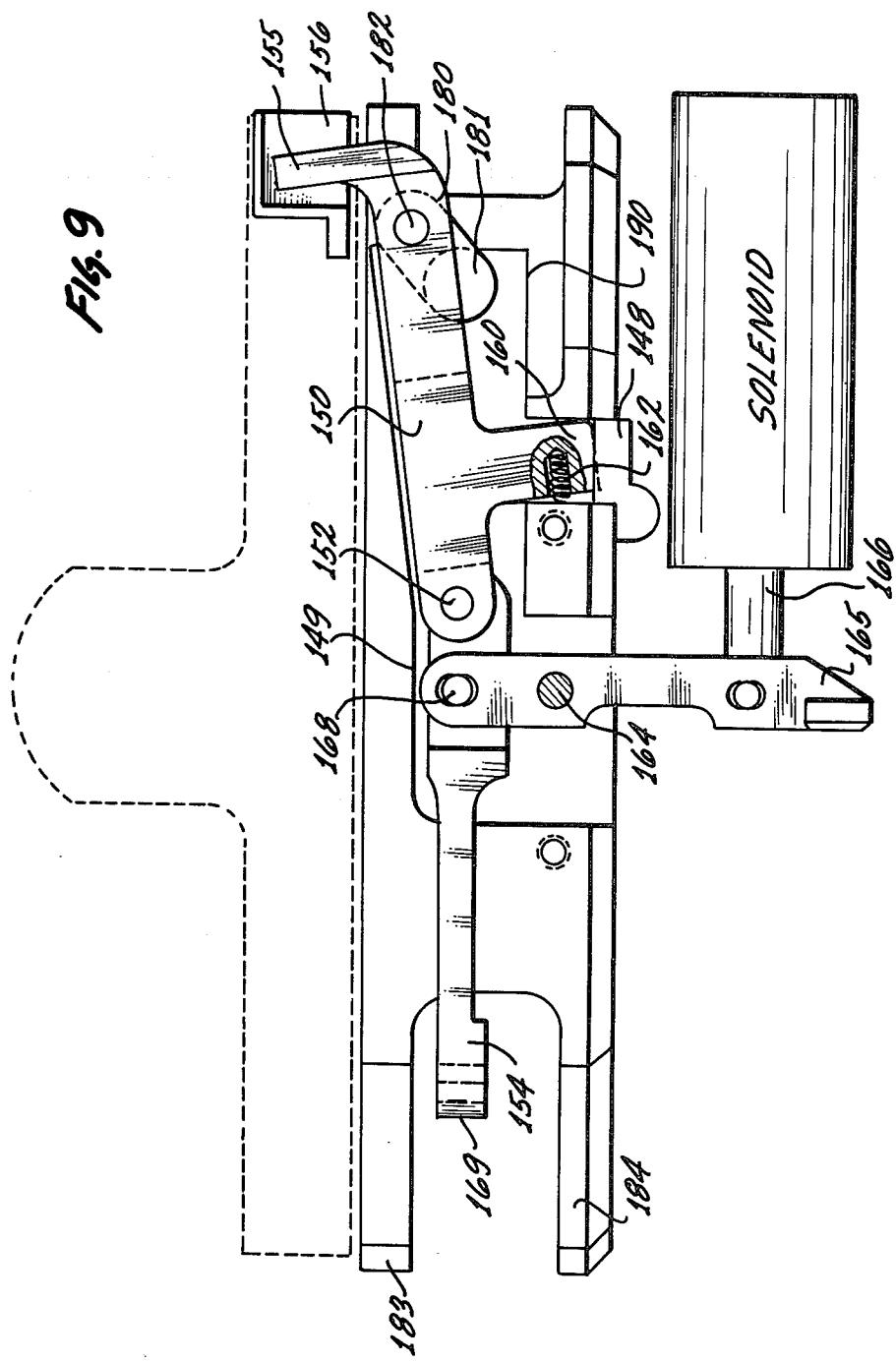

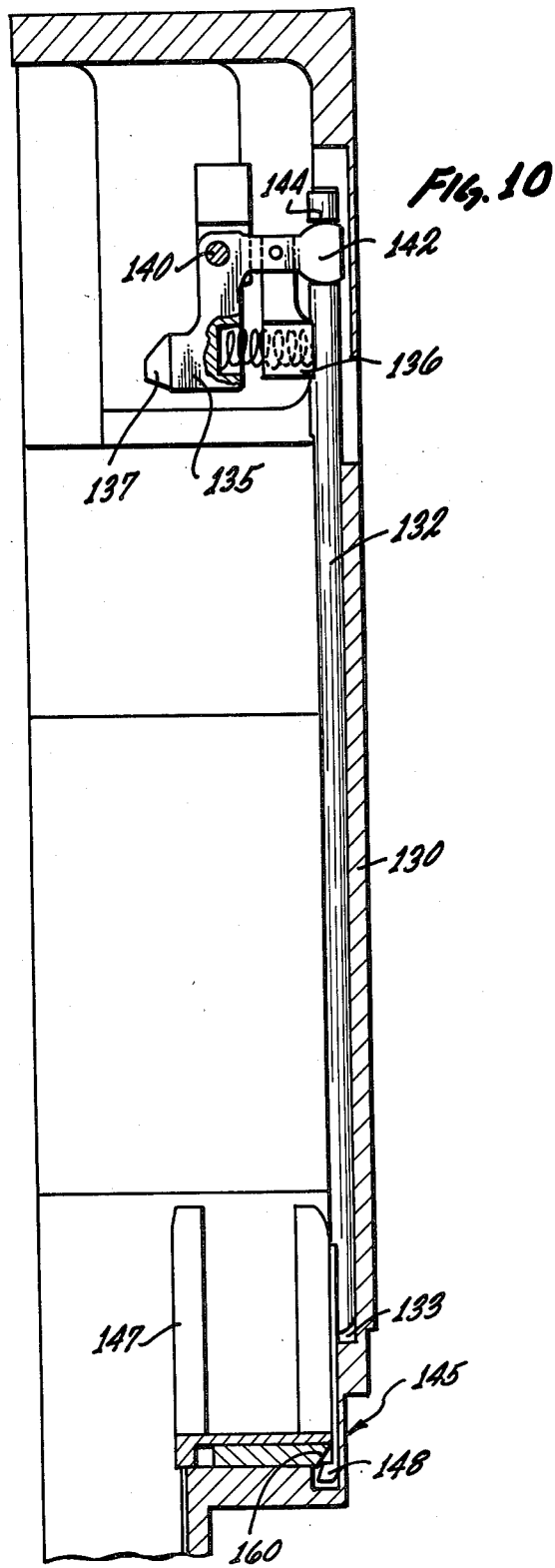

COMPACT CLUTCH MECHANISM

BACKGROUND OF THE INVENTION

1. Field of the Invention

This invention relates to a clutch mechanism and more particularly to an improved, compact, effective clutch assembly effective to engage and disengage a power source and a load.

2. Description of the Prior Art

As is known, clutches generally fall into two classes, the positive or jaw clutch and the friction clutch. In the jaw clutch it is usually necessary to move either the driven or driving member axially to disengage the clutch teeth. Normally a shifting device is used which engages a groove on one of the shafts. The jaw clutch, though simple in construction, is normally used where it is not objectionable to start the driven member or load suddenly. The objection to this type of clutch is the need for relative axial movement and for some device to shift the clutch components.

In the friction clutch, there is usually slip during engagement while the driven member is accelerated, and again, there is usually some relative axial movement between the driving and driven parts and a shifting device is usually needed.

There are situations, however, in which it is desirable to eliminate the relative axial movement normally used in friction and jaw clutches to effect engagement and disengagement of the clutch. Moreover, the use of a shifting device is sometimes objectionable because of the complexity which this adds to a clutch mechanism.

There are instances in which it is desirable to disengage driving and driven members quickly and almost instantaneously in the event of stoppage of load movement or of power source and to effect engagement once the stoppage ceases. Conventional friction clutches normally do not function instantaneously and usually require some component of the clutch to move axially. Again, in the case of a conventional jaw clutch, there is usually the need for axial relative movement.

For example, in a device driven by motor and in which a load is continuously moving in normal operation, some stoppage in the load train may require quick decoupling of the motor drive components from the load components in order to stop movement of the load components for functional or safety reasons. While stoppage may be accomplished by using a brake on the motor, this complicates motor design and motor control component design. While a jaw type clutch may be used, the need for relative axial movement and for a clutch control device renders the clutch design somewhat complex.

A typical instance in which almost instantaneous disengagement of the drive and driven components is needed is in the case of an externally powered gun. In this type of movement, gun function is controlled through an external power source, usually an electric motor. If for some reason there is a malfunction, it is desirable to stop gun function quickly, and perhaps with gun components (bolt and feed mechanism) in a prescribed position for safety reasons. It may also be desirable to control gun shut-down so that in a normal stop fire sequence, gun components are located in a precise position e.g. an open bolt normal gun shut-down mode.

Thus, it is an object of this invention to provide an improved clutch mechanism in which engagement and disengagement of the clutch is automatic without the need for any shifting mechanism.

It is also an object of this invention to provide an effective automatic operating clutch mechanism of compact design and wherein there is no relative axial movement of the clutch components.

Still another object of the present invention is the provision of a relatively simple clutch assembly which operates automatically and almost instantaneously absent any shifting mechanism and without the need for relative axial movement of the clutch assembly component parts.

SUMMARY OF THE INVENTION

The above and other desirable objectives are accomplished in accordance with this invention by a clutch assembly including axially arranged driving and driven shafts which disengage automatically when the relative speeds of driving and driven shafts changes.

In its simplest form the clutch of the present invention includes a driving shaft a portion of which includes a plurality of slots formed therein. Surrounding the driving shaft is a driven shaft, an end of which is in the form of a cylinder having apertures therein which are proportioned and located to be in alignment with the slots in the driving shaft but spaced radially outwardly thereof. Received within each of the slots is an elongated cylindrical roller bearing such that each bearing sits both in the slot of the driving shafts and the corresponding aperture of the driven shaft.

Surrounding the cylindrical portion of the driven shaft and positioned over the aperture is an resilient member which urges the bearings radially inwardly to lock the shafts together for rotation. In the event of a sudden change in the relative speed of the shafts, the bearings are forced radially outwardly of the slots of the driving shaft further through the apertures of the driven shaft, against the radially inwardly directed force of the resilient member, to decouple the shafts by permitting the roller bearings to roll along the outer surface of the driving shaft.

In a preferred form of the present invention the resilient means is sufficiently strong to maintain the shafts rotating together except in those instances where there is a sudden stoppage of one of the shafts while the other continues to rotate at or near normal speed. In this form, the resilient means is a helically machined flat cylindrical spring which requires substantial radially outwardly directed force to expand it thus permitting the bearings to remain in a driving relation, i.e.—seated, except in those instances of a sudden stoppage of one of the shafts, usually the driven shaft.

It will be apparent to those skilled in the art, after they have read the following description, that there are advantages, modes and uses that will be readily understood and apparent from the following detailed description and accompanying drawings which illustrate what are considered to be preferred forms of the present invention as set forth in the appended claims.

BRIEF DESCRIPTION OF THE DRAWINGS

FIGS. 5-7 are schematic views, for purposes of explanation; illustrating the functional operation of the mechanical interlock system of a gun including the clutch of the present invention;

FIG. 8 is a plan view, partly in section, illustrating the components of the mechanical interlock system of a gun including the clutch of the present invention;

FIG. 9 is an end view, partly in elevation and partly in section of the mechanical interlock system of a gun including the clutch of this invention;

FIG. 10 is a side view, in section and partly in elevation, of the mechanical interlock system of a gun including the clutch of the present invention; and FIG. 11 is a developed view of a clutch assembly in accordance with the present invention.

DETAILED DESCRIPTION OF THE INVENTION

While the present invention relates to a clutch assembly which is useable in various devices, an understanding of the operation of the clutch is conviently made with respect to an externally powered gun. Thus an understanding of gun function assists in understanding the need for the clutch of this invention and the advantages obtained from its relatively simple but effective structure.

Figure 1:
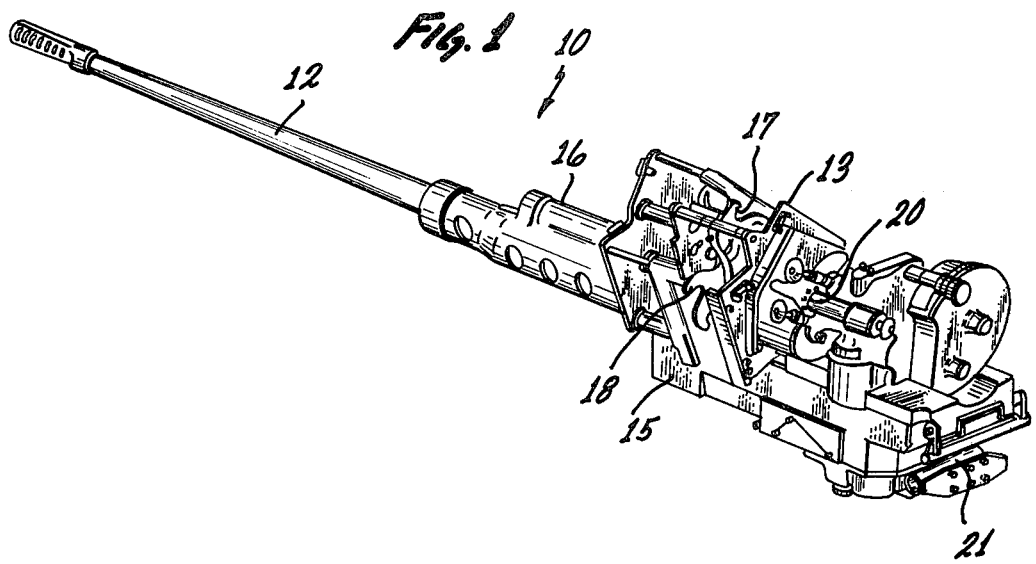
FIG. 1 is a view in perspective of a gun incorporating the clutch of the present invention.

Accordingly, referring to FIG. 1, a gun 10 is illustrated, although it is understood that the gun may take other forms as have been described, see for example Ser. No. 789,502, filed on Apr. 21, 1977 and assigned to the same assignee.

As illustrated, the gun 10 includes three major subassemblies, a barrel 12, a gearbox feeder assembly 13 weighing 32 Kg. and a receiver assembly 15, weighing 42 Kg. In the form illustrated, a 25 mm gun is shown having an overall weight of 104 Kg. and an overall length of 2743 mm. The rate of fire is single shot, 100, 200 or 475 shots per minute depending on mode and drive motor size.

The barrel 12 which is 2032 mm long and which weights 40 Kg. is locked into the breech (FIG. 4) which is part of the forward end of the receiver assembly 15, the latter including the recoil spring and damper assembly 16, which along with the barrel 12 moves rearwardly about 0.7 inches maximum in recoil.

In the form illustrated, the gun 10 includes a dual feed system including separate upper sprocket 17 and lower sprocket 18 one of which is operative to present a round to an intermittently driven transfer rotor (not shown) for presentation to the bolt located within the receiver assembly 15. Selection of either the upper or lower feed sprocket is by a clutch system 20.

The gun is externally powered through a 1.5 Hp 24 volt DC motor 21 with a nominal speed of 7700 rpm mounted on the lower under portion of the receiver 15. Through a series of gears, as will be described, the motor provides power and the basic rate of fire timing function of the gun.

Figure 2:
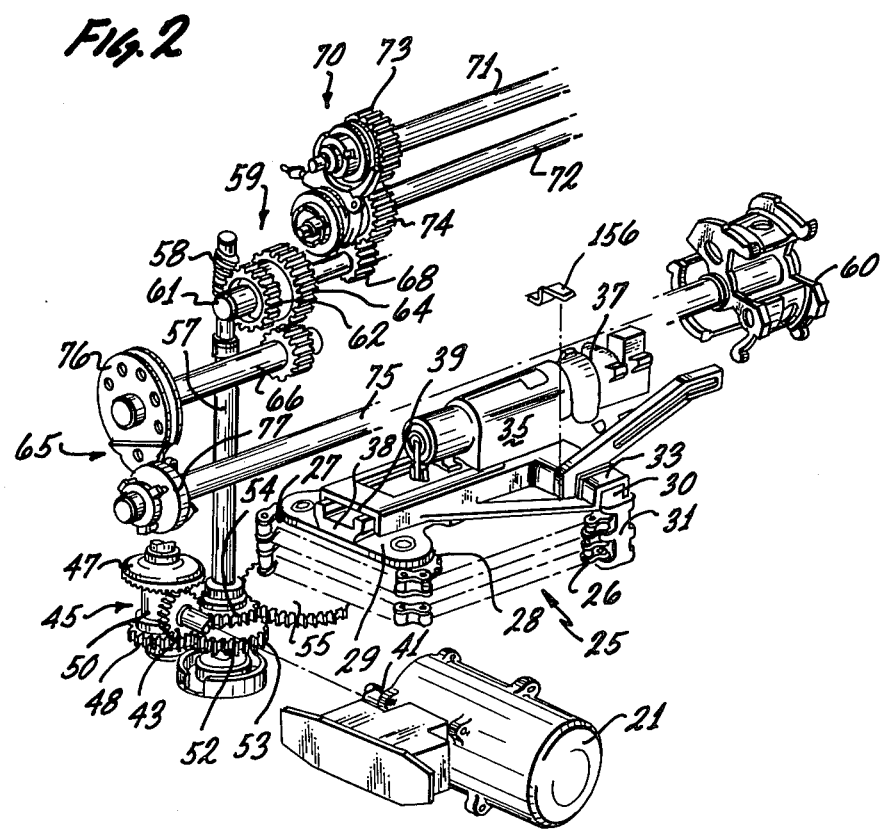
FIG. 2 is a view in perspective of portions of a gun incorporating the clutch of the present invention.

The heart of the gun is a chain drive mechanism 25 as illustrated diagrammatically in FIG. 2 and which includes a length of double row ⅜ inch pitch roller chain 26 which cycles in a racetrack pattern on four sprockets, one 27 driven and three idlers 28 supported in a track 29. A bolt drive slider 30, fixed to a master link 31 of the chain 26 and acting in a traverse slot 33 on the underside of a bolt carrier 35, converts rotational chain motion to reciprocating motion of a bolt 37 on the track, the latter including a surface track 38 cooperating with a slide 39 on the underside of the carrier. The slot 33 for the slider 30 extends transversely across the carrier 35. Also carried on the carrier 35 is a forward eject finger 40.

Connected to the rotating drive shaft 41 of the motor 21 is a pinon gear 43 which drives a clutched gear assembly 45 made in accordance with this invention. The clutched gear assembly, the details of which will be described, includes an upper bevel gear 47 driven by the pinon gear 43, the bevel gear driving a lower gear 48 through a clutch 50. Cooperating with the clutched gear assembly 45 is a chain drive and worm gear assembly 52 including a lower gear 53 driven by gear 48 and an intermediate gear 54 splined to be driven with 53. The intermediate gear 54 drives a chain drive assembly gear 55 splined to gear 27 to drive the chain 26. All of the gears and shafts are supported by bearings, as is well known.

Forming part of the chain drive and worm gear assembly 52 is a drive shaft 57 having a worm 58 on the end and operating through a gear train 59 to drive the infeed sprocket assemblies 17 and 18 and a feed rotor assembly 60 (partly shown). The worm 58 drives a transfer shaft 61 through transfer gear 62, the shaft having a drive gear 64 for an indexing drive assembly 65 driven by a shaft 66. Also affixed to shaft 61, as shown, is a smaller drive gear 68 which drives one or the other, but not both of the sprocket assemblies 17, 18 through a gear and clutch assembly 70, shaft 71 driving the upper sprockets 17 and shaft 72 driving the lower sprockets 18.

The clutch and gear assembly 70 includes a pair of constant mesh gears 73 and 74 driven by gear 68, the constant mesh gears driving one or the other of the upper or lower sprockets through a double acting clutch in the form of a single-tooth ratchet clutch which provides timing with the sprocket which is being driven. The feeder controls 20 are as described. Thus, in normal gun operation either one or the other of shafts 71 or 72 is rotated to drive continuously, and at a speed controlled by the motor and gearing, one or the other of the upper or lower feed sprockets, i.e. once the upper or lower mode is selected, the gun will continue in that mode until a switch is made.

The indexing drive assembly 65 is a paradromic indexing mechanism, sometimes referred to as an intermittent drive system, in which shaft 66 is continuously driven. Shaft 66 cooperates with shaft 75 connected to the feed rotor 60 through the intermittent drive to rotate the feed rotor 60 one-third of a revolution for each shot of the gun.

One end of shaft 66 includes a Fergerson cam 76 driven at a constant velocity, cam 76 cooperating with cam 77 on shaft 75 to effect intermittent rotation of the rotor 60. The cams 76 and 77 are timed to a dwell of 276 degrees for cam 77 and by an 84 degree index for feeding.

Figure 3:
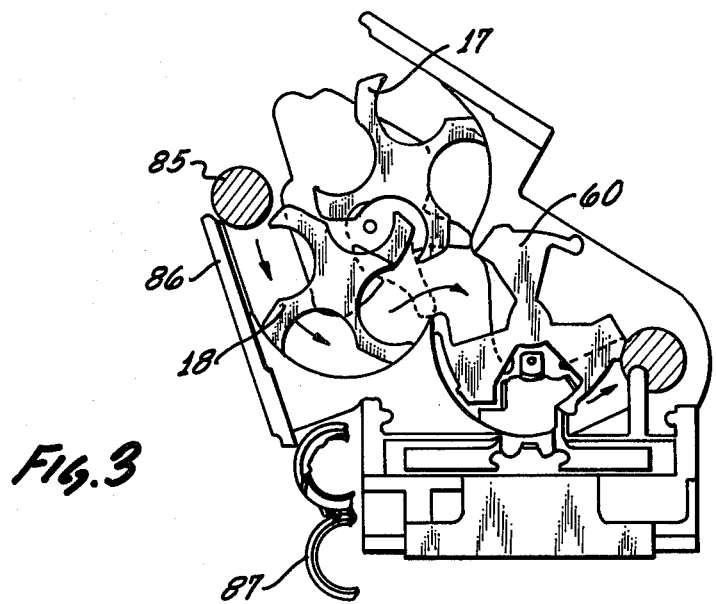
FIG. 3 is a diagrammatical view of the infeed mechanism of a gun incorporating the clutch of the present invention.
Figure 4:
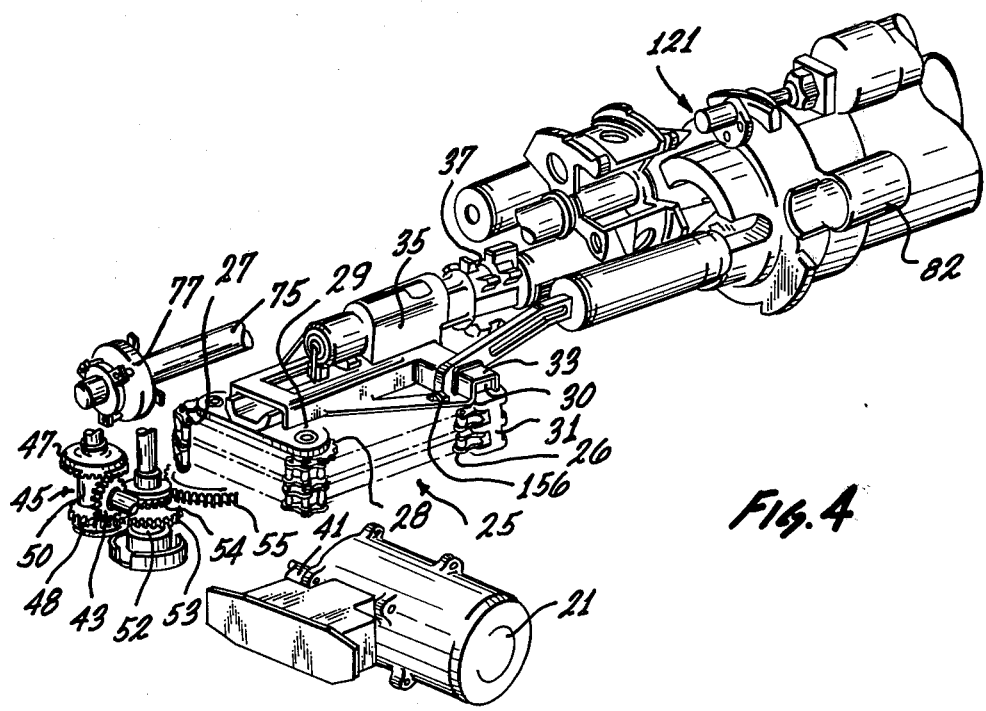
FIG. 4 is a view in perspective, similar to FIG. 2, but showing more of the details of a gun incorporating the clutch of the present invention.

Referring now to FIGS. 2-4, the overall gun operation may be understood. The normal gun sequence is ramming, firing and extracting. In the normal shutdown mode, the carrier and bolt are in the rearward position with the master link located slightly forward of the centerline of the drive sprocket 27; with the spent casing held on the front face of the bolt. When motor 21 is energized, several events are started: the selection feed sprocket assembly is driven and the chain 26 is driven. There is a slight rearward movement of the carrier as the master link traverses around the drive sprocket thus bringing the carrier and bolt to the rearward-most position. As the master link 31 moves laterally, the carrier and bolt are stationary and the slide 30 moves laterally through the transverse slot 33.

During the rear dwell of the bolt, the feed rotor 60 starts to index, initially slowly, then reaches a maximum speed, then gradually slows to a stop in a one-third revolution, in a sinusoidal acceleration mode. During indexing of the feed rotor, the feed rotor land moves the spent casing in front of the forward eject finger 40 (see FIG. 4) and places a new round at the bolt face. At the same time, the infeed sprockets, which move at constant velocity, have presented a new round to the available empty feed rotor cavity.

At approximately this point, the master link 31 starts moving around the first idler sprocket 28 and the carriage and bolt start to accelerate slowly towards the breech in the start of a ramming sequence. The transition in master link travel from lateral to axial travel represents a gradual, smooth slow start of the bolt forward, with increasing speed of travel as the master link approaches axial movement, the latter representing the maximum forward speed of the carrier and bolt, the bolt drive slider 30 being in the right-most position of the carrier slot 33. As the carrier and bolt reciprocate forward, the round in the bolt face is rammed and the spent casing is ejected out a forward eject port 82. During this movement of carrier and bolt by the continually moving chain 26 and master link, the infeed sprockets are continuously moving but the feed rotor 60 is stationary. It is to be understood that ejection of the spent casing may be out the side or in other ways.

As the master link approaches the end of its axial movement forward and starts to turn around the right front idler sprocket 28 (as seen in FIG. 4), the movement of the carrier and bolt gradually decelerate and the slider 30 moves right to left in lateral movement in the carrier slot 33. During this phase, the carrier and bolt are stopped, and the bolt is locked in the breech and the round fired. The infeed sprockets are still driven as is the chain but the rotor 60 is stationary. As the master link makes the transition from lateral to rearward axial movement to the rear, around the front left idler sprocket, the bolt is unlocked and the carrier and bolt acelerate gradually to the rear, reaching maximum rear speed as the master link starts axial rear movement. The spent casing is carried rearwardly on the bolt face and as the master link approaches the drive sprocket 27, the sequence repeats itself.

As is apparent from the description thus far, the generally racetrack movement of the chain provides alternately axial and lateral movement of the slider and reciprocating movement of the carrier and bolt. The axial motions cause bolt movement fore and aft while the lateral motion of the slider provides free travel through the carrier slot. The free travel provides appropriate dwell time for firing and feeding at the fore and aft ends of the cycle. Further, during the relatively long firing dwell, the bolt remains locked, thus permitting barrel pressure to return to ambient and assuring essentially zero gas flow into the receiver and upon bolt unlock. Also, the system of sprockets and chain act to accelerate the bolt smoothly, move it at constant velocity and then decelerate it smoothly.

Referring now to FIGS. 3 and 4, the gun of the present invention provides for 100% round control. The infeed sprockets interfaces with the reciprocating bolt assembly through the intermittently driven feed rotor 60. As shown in FIG. 3, where the lower feed sprocket 18 is engaged, the feed sprocket powered by the gun drive motor, as described, brings ammunition 85 into the gun at constant velocity through a pair of link strippers 86 (one being shown). The feed sprockets are compact four tooth units which provide positive engagement of the ammunition belt. As the cartridges are stipped, the links 87 drop away and the cartridge is guides out of the feed sprocket and placed successively into the presented cavity of the feed rotor 60, the latter provided with three cavities at 120 degree orientation, as shown. The feed rotor is stationary while the bolt rams, fires and extracts the previous round, the feed rotor motion being effected as previously described through the intermittent indexing mechanism. The movement of the rotor is that of controlled acceleration, constant velocity and controlled deceleration. Simultaneously the feed rotor sweeps the fired casing out of the bolt and presents the new round from the feed sprocket into the bolt face.

The feed rotor operates as the means to pass the cartridge from the feed sprocket to the bolt face. The rotor 60 contains three cavities, uniquely shaped, as illustrated in FIG. 4. Each cavity has a basic diameter which matches the case diameter, with reliefs cut into them to clear the locking lugs, as shown, on the bolt. Since all gun motions which act on the round are smoothly generated, there are no impacts.

With this background, one can understand the improvement of the present gun over that described in Ser. No. 789,502 supra, in the provision of a unique clutch assembly and a safety interlock system to eliminate the hazard associated with hangfires. As will be described, the normal gun shut-down sequence is in the open bolt position, through the action of a sear and master link. The hangfire system operates on the basis that the gun must experience recoil for firing to continue, otherwise a safety link on the chain is stopped by the sear while the bolt remains locked. To resume firing, the gunner releases the trigger and restarts gun operation. In the gun described the elapsed time of the "stop-start" sequence is about 500 milliseconds. The data to date indicates that the maximum hangfire for any known 25 mm ammunition is in the order of 150 milliseconds. Since the firing dwell (firing pin fall to bolt unlock) of the described gun is 51 milliseconds for a rate of 200 shots per minute, the added 500 milliseconds delay provides for between 550 and 600 milliseconds of safe bolt lock time to ensure hangfire safety for the gun.

In the case of higher rates of fire, 500 shots per minute, the firing dwell decreases to 19 milliseconds. Nonetheless, the hangfire is usually less than 15 milliseconds, with the 150 milliseconds figure being a "worst case" number. Thus, even though there may be a hangfire for failure of the round to clear the gun in the 3–6 millisecond interval of normal ammunition firing, the firing dwell is long enough for most technical hangfires, however, for longer hangfires, the system works well.

The system for hangfire protection is diagrammatically illustrated in FIGS. 5–7. As shown in FIG. 5 the gun is in the normal open bolt shut-down, mode. A sear solenoid 100 is de-energized (i.e. extended position) and a sear 105 is biased by a spring 107 against the master link 31 which is positioned in travel just forward of the center-line of the drive sprocket. FIG. 5 also illustrates the points in master link travel approximately where the bolt lock, fire, recoil and unlock sequence takes place in relation to the position of the master link position. Forward of the master link 31 with respect to the direction of chain movement is a safety link 110. A recoil latch 115 is in the unlatched position and a recoil pushrod 116 is in the static, non-recoiled position.

As shown in FIG. 6, gun action has just started. The solenoid 100 is energized (i.e. retracted position) and the sear 105 is de-energized permitting the chain to move. The recoil latch 115 is about to be set by movement to the right of a recoil latch foot 118. After sufficient movement of the latch foot, the latch 120 is spring loaded into place. As the latch is being latched (see FIG. 7), the solenoid 100 is over-powered and the sear is positioned to pick up the safety link.

If the chambered round properly fires, the barrel and creech 121 moving the recoil latch 120, through the pushrod 116, releasing the foot 118 so that the sear is retracted by the solenoid which is still energized as described in connection with FIG. 6. After firing, however, the master link is at the position of about 124 and the safety link is at position of about 125. If, however, there is a hangfire, there is no recoil, the pushrod fails to move to release the foot and the sear engages the safety link 110 before the unlock position is reached, as shown in FIG. 7, to halt chain movement before the bolt unlocks.

Since the latch mechanism works against the action of the solenoid, de-energizing the solenoid permits the sear spring to hold the safety link, allowing the latch to de-latch, with the parts as seen in FIG. 5, except that the sear engages the safety link 110 rather than the master link. When the solenoid is energized some 500 plus milliseconds after the hangire, the parts are in the position as shown in FIG. 6 except that the safety link 110 has passed the sear and the master link is starting axial rearward movement to carry the bolt to the rear. Should a shut-down sequence now occur, the sear engages the master link because the solenoid is de-energized.

In the absence of a hangfire, the latch is reset by a reset cam carried on the bolt carrier and which trips a finger in the latch mechanism.

Referring now to FIGS. 8–10, the details of the mechanical interlock system are shown and located in the lower portion and adjacent the rear wall of the receiver housing 130. At the barrel end of the receiver is an actuator rod assembly 131 including an actuator rod 132 seated for movement in a groove 133 in the base of the receiver housing. Cooperating with the rod 132 is a rocker 135 (FIG. 10) which is biased upwardly by spring 136 such that a rocker finger 137 is maintained in contact with the breech.

A rocker arm support rod 138 passes through the rocker 135 and is supported at one end in the receiver wall and at the end within the receiver wall, as shown. The support rod is of reduced thickness where it passes through the rocker and forms a pivot 140 about which the rocker rotates. The arm 142 of the rocker is bifurcated to engage a flat 144 on the end of the actuator rod 132.

During recoil, the breech moves to the rear with the barrel causing the rocker to rotate about pivot 140 moving the actuator rod 132 towards the barrel from its normal position as shown in FIG. 10. One end 145 of the actuator rod passes beneath a rear horn guide 147 and includes an inclined foot 148 which is also moved towards the barrel.

Mounted in a slot 149 (FIG. 9) forward in the rear face of the rear horn guide 147 which faces the rear wall of the receiver is a pushrod extension 150 which is pivotally mounted at 152 to a pushrod 154. The pushrod extension 150 includes a finger 155 which extends above the receiver wall for contact by a reset cam 156 carried on the bolt carrier, see FIGS. 2 and 4. As shown, the reset cam 156 is formed by a cam surface open at the rear and downwardly inclined toward the front, i.e. toward the barrel. The pushrod extension 150 also includes a pushrod extension foot 160 inclined to be complimentary with the shoe 148 of the actuator rod (FIG. 10). A spring 162 is received within the rear wall of the rear horn guide and also within an aperture 163 tending to urge the foot to the right as viewed in FIG. 9.

Also pivotally mounted at 164 to the rear wall of the receiver is a release link 165 one end of which is affixed by an oblong slot and to a solenoid plunger 166, and pivoted to the pushrod 154 at a pushrod extension pivot 168 also in an oblong slot. The end 169 is connected to a pivotable sear assembly 170 (FIG. 8) which includes a sear 171 mounted in a sear rocker 172 the latter pivotable about pivot 173, the sear 171 being spring and shock mounted by a plurality of Belville springs 174. The sear rocker 172 is mounted to the pushrod 164 by a pin 176. Also cooperating with the pushrod extension 150 is a crank 180 (FIG. 9) the latter being pivoted at one end 181 into the rear horn guide and at the other end 182 to the pushrod extension. As illustrated, the rear horn guide which guides the chain on its sprockets includes fingers 183, 184 through which the sear 171 may be pivoted to engage either the safety link or the master link. Not shown is a spring (corresponding to spring 107) located in the left side wall of the receiver which biases the sear assembly such that the sear 171 contacts the master link.

The latching mechanism includes basically the pushrod 132 and breech rocker 134 and the crank 180 and push-rod extension 150 and reset cam 156. As a general comment in understanding the interlock system, whenever the pushrod extension finger 155 is in the up position, the latching mechanism is in the released position. Accordingly, to understand the operation of the hangfire interlock system, various gun function modes are discussed as follows.

Assuming normal shut-down, i.e. a round has just been fired and the gun is in a normal cease fire condition, referring to FIG. 5 and FIGS. 8–10, the solenoid 100 is de-energized and in the extended position. Spring 107 biases the sear 171 into contact with the master link 31 since the pushrod 154 is biased to the right (as viewed in FIG. 9) and the sear assembly is pivoted around 173 in a clockwise direction (FIG. 8). The bolt and carrier are not quite to the fully retracted position and the reset cam 156 has not yet depressed the pushrod extension finger 155. The acutator rod 133 is to the rear such that shoe 148 is to the rear of the foot 160 (see FIG. 10).

When the gun is activated, power is provided both to the motor 21 and to activate solenoid 100 (retracting the solenoid plunger), and release link 165 is rotated to the unsear position against the spring 107. Once the sear releases from the master link, the chain starts to move, retracting the bolt and carrier assembly and the reset cam 156 trips the pushrod extension finger 155 forcing it downwardly as viewed in FIG. 9. The crank 180 acts as an over the center latch holding the pushrod extension down against a shoulder 190 in the rear horn guide, provided the solenoid is activated. The downward movement of the finger 155 overcomes the solenoid to place the sear into the sear position (the master link having passed) and the crank 180 operates the hold the interlock system in the latched condition. Since the actuator rod 132 is to the rear, the finger 155 can be depressed because the foot 160 clears the shoe 148.

Normal gun function continues, with the sear rotated to the engage position but not yet engaging either the safety link or master link, since neither of the latter have reached the sear.

As the master link reaches the bolt lock position (FIG. 5), the round is in the chamber and the bolt locked. If the chambered round fires properly the barrel and breech will recoil, tripping the rocker 137, urging the actuator rod toward the barrel and causing the shoe 148 to trip the foot 160, which rotates the pushrod extension upwardly around pivot 152 and releasing the crank 180. Since the solenoid is actuated, it moves the sear to the retracted or unsear position and the safety link passes the sear. Normal gun function then continues, i.e. the bolt is unlocked, coming to the rear and the bolt cam trips the finger 155 for the next sequence.

In the event of a hangfire, one of two things may take place. In the first, the bolt remains locked in the breech and if the round fires after the fire point (FIG. 5) but before or at the time the safety link reaches the sear in the sear position, normal gun function continues through the recoil sensing mechanism, as described. If, however, the round does not fire, the sear engages the safety link and gun function ceases. To restart the sequence, the gun operator releases the control mechanism which turns off all power to the gun. When this is done, the spring 107 maintains the sear engaged but the momentary deactivation of the solenoid permits the crank 180 to delatch by the action of spring 166 which pivots the pushrod extension upwardly to the release position. When the fire control mechanism is again engaged, the solenoid overcomes the sear spring, releasing the sear and gun function continues, as normal, with the dud round being ejected. As the bolt comes to the rear, the cam sets the finger 155 as described.

In a normal shut-down sequence, the solenoid is de-energized, and the sear spring is biased by spring 107 into the sear position to engage the master link. In dry cycling, the gun functions as if there were a hangfire, i.e. the sear engages the safety link and the stop-start sequence must be followed. The advantage is that the hangfire interlock can be checked by dry cycling. If the gun continues to cycle, there is a malfunction of the hangfire interlock system which should be corrected, if the hangfire interlock system is needed.

As noted during normal shut-down or hangfire shut-down, the chain is abruptly stopped to stop all gun function. Since the gun is externally powered through motor 21, an improved compact clutch gear assembly 45 is provided between the motor 21 and the chain and feed mechanism. In this way the motor can be declutched while permitting the motor to rotate until the internal motor brake functions to stop motor rotation.

Referring to FIG. 11, the compact and unique clutch-gear assembly is illustrated and includes a gear 200 in the form of a bevel gear splined to drive shaft 202. The shaft 202 includes three slots 204 arranged at 120 degrees spacing around the periphery of the shaft. Received in the slots are three roller bearings 205. Cooperating with the drive shaft 202 is driven shaft 210 having a gear 211 thereon, the shaft 210 being hollow to receive shaft 202. Shaft 210 is also provided with slots or apertures 212 arranged at 120 degrees about the periphery and alignable with the slots 204. Thus, when positioned, the bearings 205 are seated in the slots 204 and 212 to connect the shafts 202 and 210 in driving relation.

Surrounding the shaft 210 is a machined spring 215, the spring being in the form of a flat metal in a cylinder with a helix 216 formed in it. The inner diameter of the spring 215 is so proportioned that it fits over shaft 210 to urge the roller bearings radially inwardly into the slots 212 and 204 to lock the shafts for rotation together. In the event that shaft 210 ceases to rotate, because of the stopping of some component driven by gear 212, the inner shaft 202 driven by the motor continues to rotate forcing the roller bearings outwardly through slots 212 against the spring 215 to expand the same, and declutching shafts 202 and 120 to permit the inner shaft to rotate relative to the outer shaft 210. In this mode, the bearings 205 are carried by the slots 212 and snap in and out of recesses 204 under the action of the spring 215 for as long as shaft 202 rotates relative to shaft 210. When shaft 210 is free to rotate again, the spring urges the bearings radially inwardly by seating in the slots 204 and 212 to drive the shafts together.

In the form illustrated, the gear-clutch assembly declutches whenever the master link or safety link is engaged by the sear since gear 211 is driving gear 27 of the chain drive. As illustrated bearings 220 and 221 support shafts 202 and 120.

The inner diameter of the shaft 210 is proportioned with respect to the diameter shaft 202 such that there is a clearance between the two. The bearings have a diameter greater than the clearance between the two shafts such that as the bearings are urged radially outwardly of the slots 204 in shaft 202 against the force of the spring 215, the bearings are retained in the slots or apertures 212 in the cylindrical portion of shaft 210. Thus as one or other of the shafts rotate relative to the other, the bearings roll over the surface of the inner shaft (including the slots) and are retained in the apertures by virtue of the spring which tends to urge the bearings radially inwardly.

When the two shafts are free to rotate together, the bearings are snapped into the slots as they roll over the slots, the spring biasing them into the slots and both shafts are locked together for rotation. The bearings are accordingly proportioned relative to the depth of the slots and the cross section of the cylindrical wall such that when seated in the slots, they are also seated and extend through to at least the outer surface of the cylinder. Likewise the spring is dimensioned to contact the outer surface of the bearings and rotates with the outer shaft when the latter rotates.

Usually, for reasons described, it is the outer shaft which stops rotating due to a functional stoppage of the load train connected to the driven shaft and thus the driving shaft rotates while the driven shaft and spring are stationary.

It will be understood from the foregoing that in its preferred form the clutch assembly 45 of this invention automatically declutchs when the driven shaft is abruptly stopped for any reason. To this end, the spring 215 is sufficiently strong to exert a sufficiently strong radially inwardly directed force to keep the elongated roller bearings seated in the slots and apertures to keep the shafts locked together, except in those cases in which either the driven or driving shaft suddenly stops while the other keeps rotating.

As described, engagement of the sear and either of the master link in normal shut down or of the safety link in hangfire shut down stops the movement of all load components driven by the driven shaft and the driven shaft itself stops rotating. When this occurs, the clutch automatically decouples the two shafts permitting the motor to contain until electrically de-energized.

When start up takes place, the sear is pulled away from the safety link or master link at the same time the motor is energized and the clutch then locks and both shafts rotate together since the components in the load train are free to move.

As shown, the clutch is compact, only a few parts, quite effective and automatic without any external shifting mechanism or axial movement of any parts.

While the preferred form of clutch has been described, it will be apparent that modifications may be made and that the disclosure is for illustrative purposes and does not limit the invention which is defined in the follow claims.

What is claimed is:

1. A clutch mechanism comprising:
    a driven shaft,
    a driving shaft,
    one of said shafts including means forming a plurality of slots in a portion of the outer surface thereof,
    the other of the said shafts being axially aligned with said one shaft and including a portion which is cylindrical and overlies the portion of said one shaft which includes said slots,
    said other shaft including means forming a plurality of apertures aligned with said slots in said one shaft,
    a plurality of roller bearings received in said slots and said apertures, and
    a helical spring formed by a helix coaxial with said shafts and defining a cylinder and having portions of the inner surface of said cylinder which contact said roller bearings to urge said roller bearings radially inwardly to connect said shafts together for rotation, said apertures permitting radial outward movement of said bearings to permit one of said shafts to rotate relative to the other.

2. A clutch as set forth in claim 1 wherein a load train is attached to be driven by said other shaft and wherein a power source is attached to said one shaft.

3. A clutch mechanism as set forth in claim 1 and further comprising a gun having a power source attached to drive said one shaft, and means to effect feeding of said gun and means to effect movement of the bolt mechanism, both said means being driven by said other shaft.

4. In a gun having a bolt assembly, a drive assembly to drive said bolt assembly and a feeder assembly, said assemblies being driven by a motor, a clutch mechanism comprising:
    a shaft connected to be driven by said motor,
    a shaft connected for driving said assemblies,
    one of said shafts including means forming a plurality of slots in a portion of the outer surface thereof,
    the other of said shafts being axially aligned with said one shaft and including a portion which is cylindrical and overlies the portion of said one shaft which includes said slots,
    said other shaft including means forming a plurality of apertures aligned with said slots in said one shaft,
    a plurality of roller bearings received in said slots and said apertures, and
    a helical spring formed by a helix coaxial with said shafts and defining a cylinder and having portions of the inner surface of said cylinder which contact said roller bearings to urge said roller bearings radially inwardly to connect said shafts together for rotation, said apertures permitting radial outward movement of said bearings to permit one of said shafts to rotate relative to the other.

5. A clutch mechanism as set forth in claim 4 wherein upon declutching said assemblies are stopped and said motor continues operation.

6. A clutch mechanism as set forth in claim 5 wherein said driven shaft is connected to drive said assemblies, said drive assembly for said bolt including means to stop driving thereof, and said clutch being operative in response to stoppage of said driving means to declutch said motor from driving said assemblies.

7. A clutch mechanism as set forth in claim 1 or 4 wherein said slots and apertures are elongated and said bearings are elongated roller bearings.

8. A clutch mechanism as set forth in claim 1 or 4 wherein said cylindrical spring to urge said bearings radially inwardly is sufficiently strong to maintain said bearings seated in said slots and apertures except when rotation of one of said shafts is stopped relative to the other.

9. A clutch mechanism as set forth in claim 1 or 4 wherein said one shaft is the driving shaft.

10. A clutch as set forth in claim 1 or 4 wherein said bearings are proportioned to be received in said slots and apertures in a radially inwardly driving position and to be received in said apertures in a radially outwardly position.

11. A clutch mechanism as set forth in claim 1 or 4 wherein said shafts are axially fixed relative to each other.

12. A clutch mechanism as set forth in claim 1 or 4 wherein said shafts are proportioned such that there is a clearance between said portions of said shafts, and
    said bearings being proportioned to seat in both said slots and apertures in one position thereof and in said apertures in a second position thereof.

13. A clutch as set forth in claim 1 or 4 wherein said spring rotates with said other shaft as the latter rotates and is stationary when said other shaft is stationary.

* * * * *